V. L. J. BOURGEOIS.
LOADING AND UNLOADING APPARATUS FOR TRUCKS.
APPLICATION FILED DEC. 4, 1920.
1,427,189.
Patented Aug. 29, 1922.
12 SHEETS—SHEET 1.
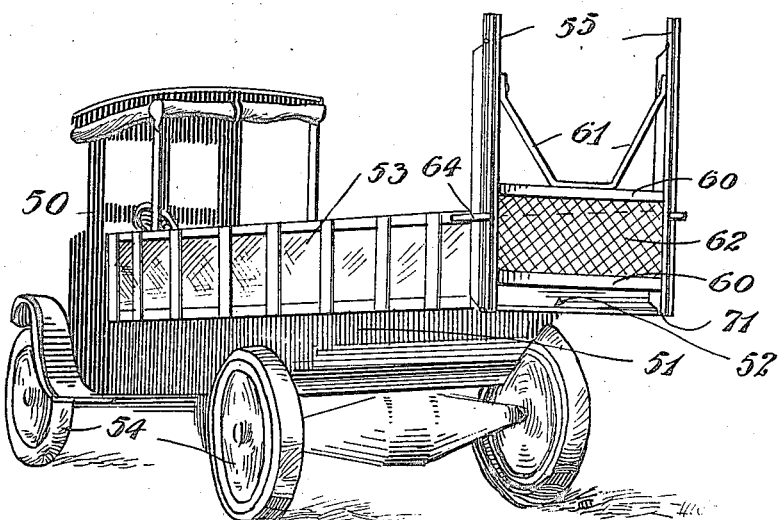
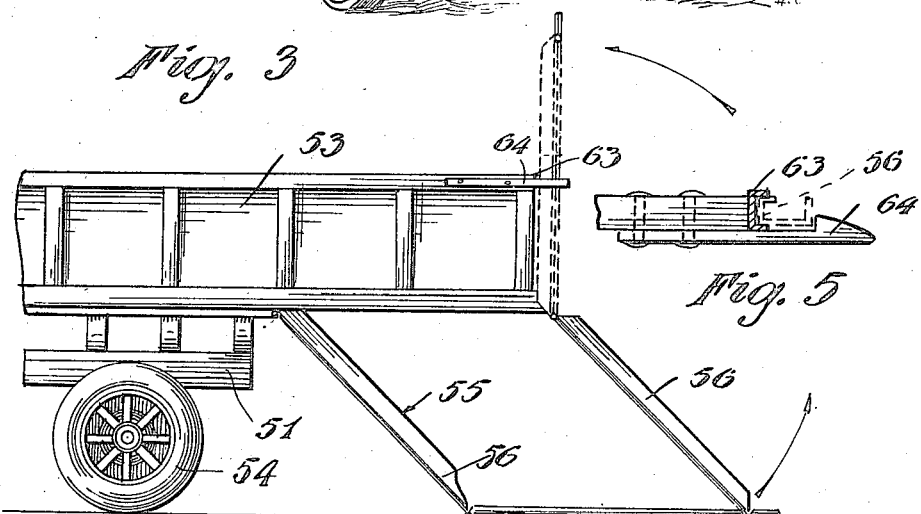
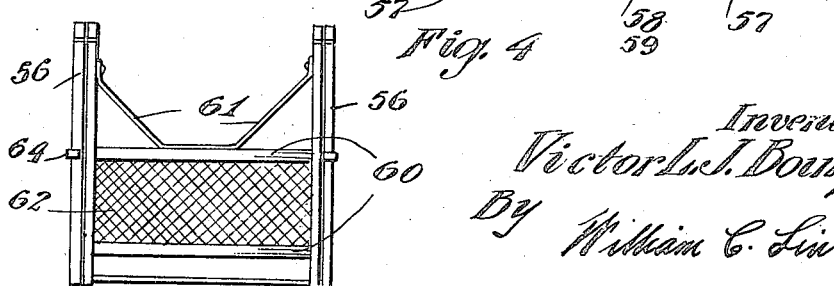
Inventor:
Victor L. J. Bourgeois
By William C. Linton
Attorney

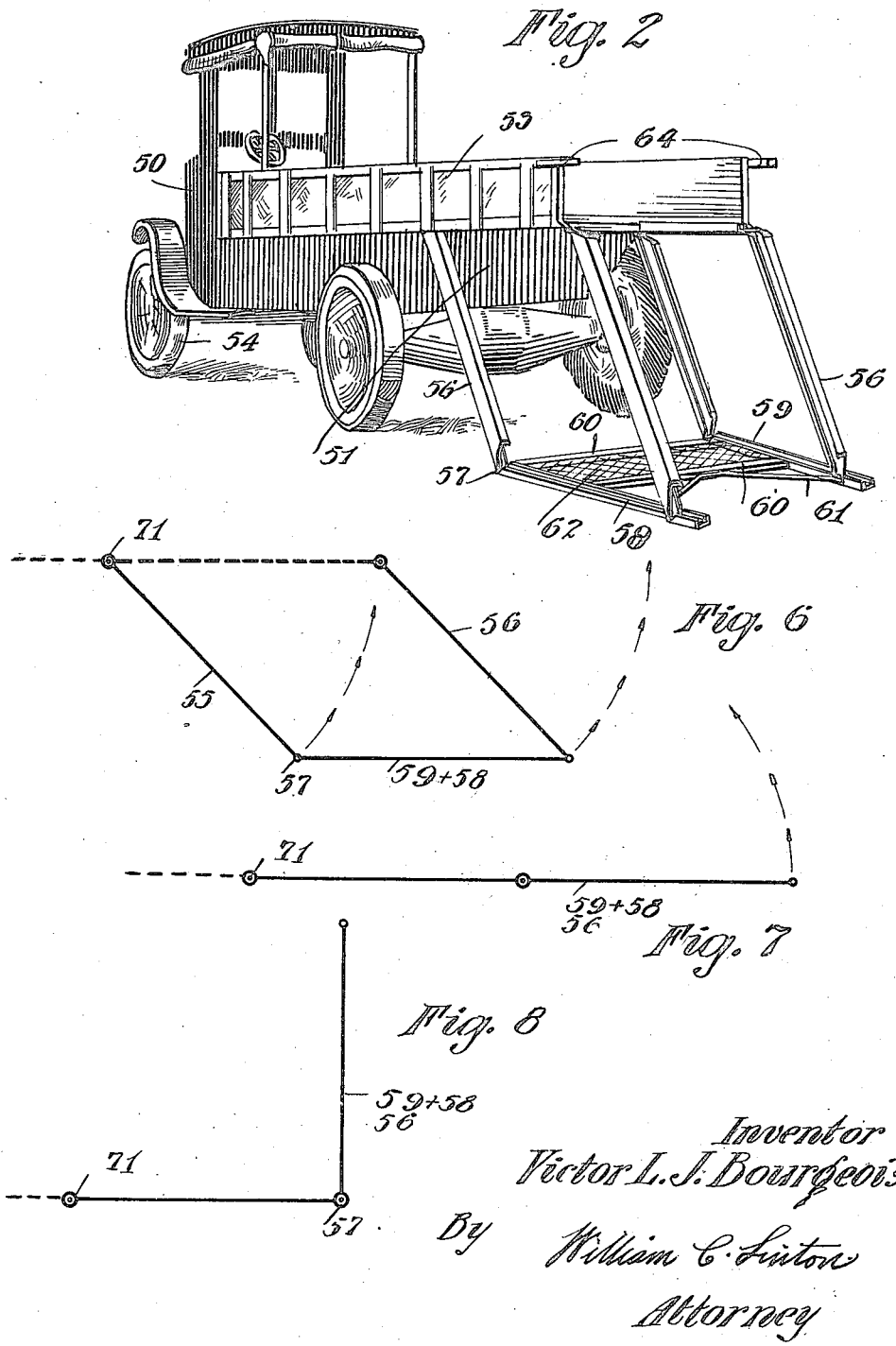

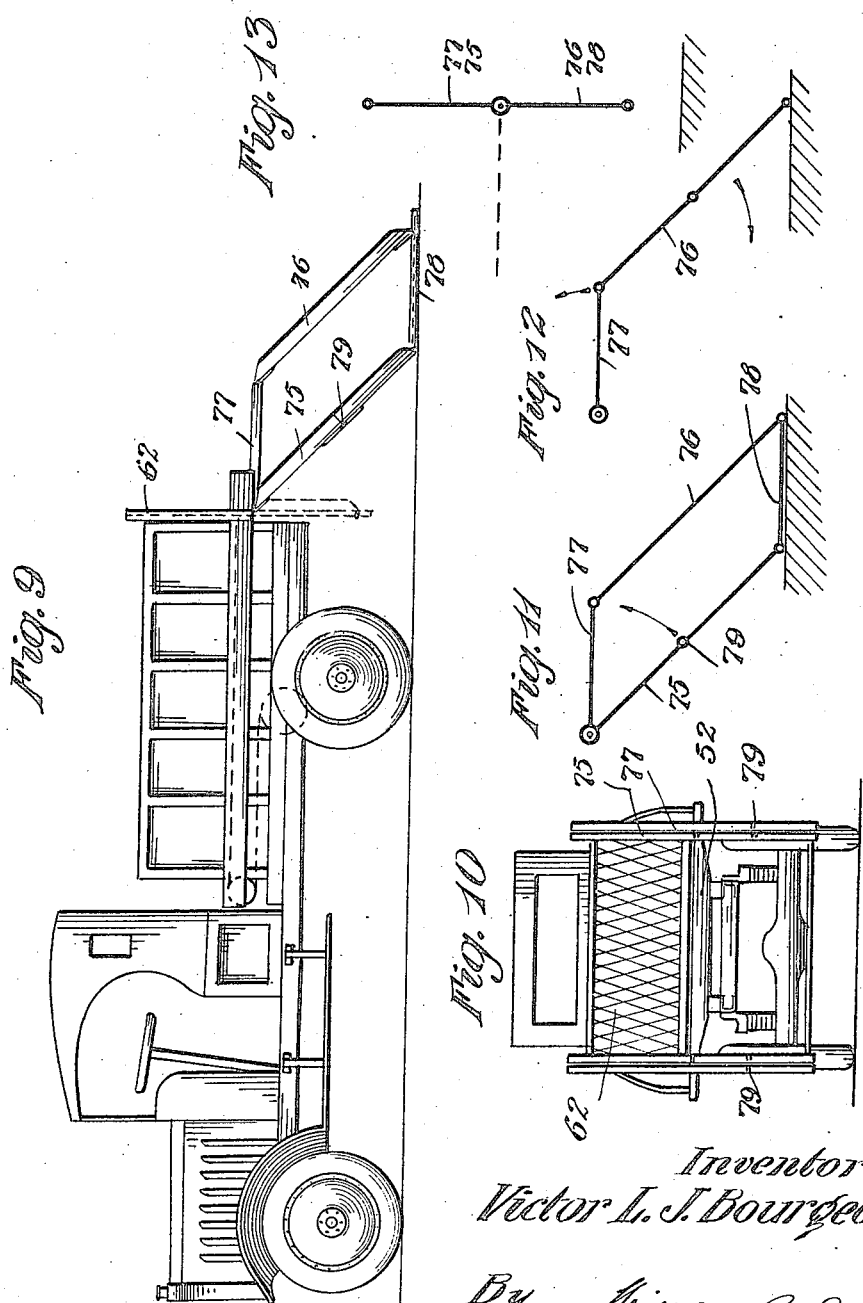

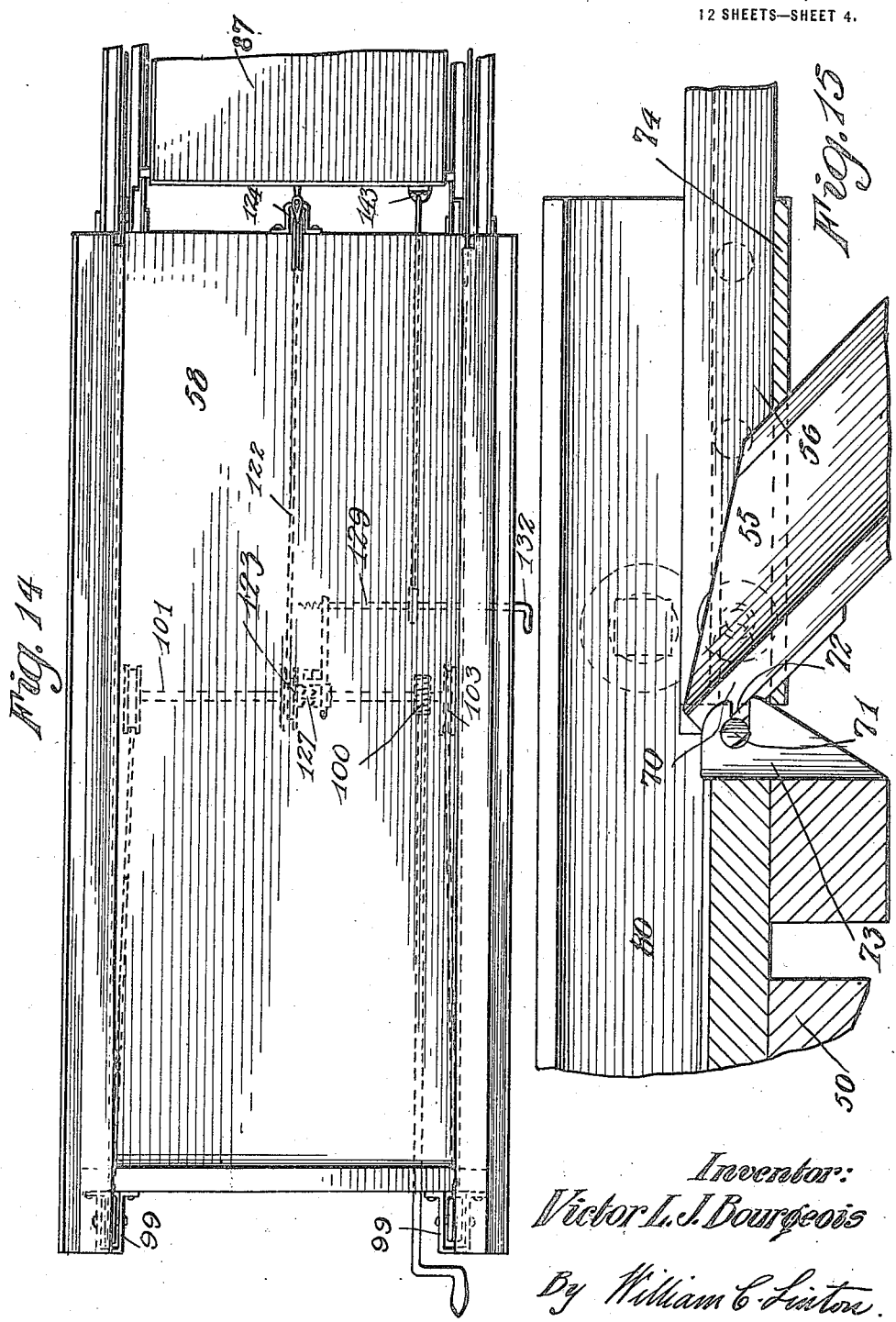

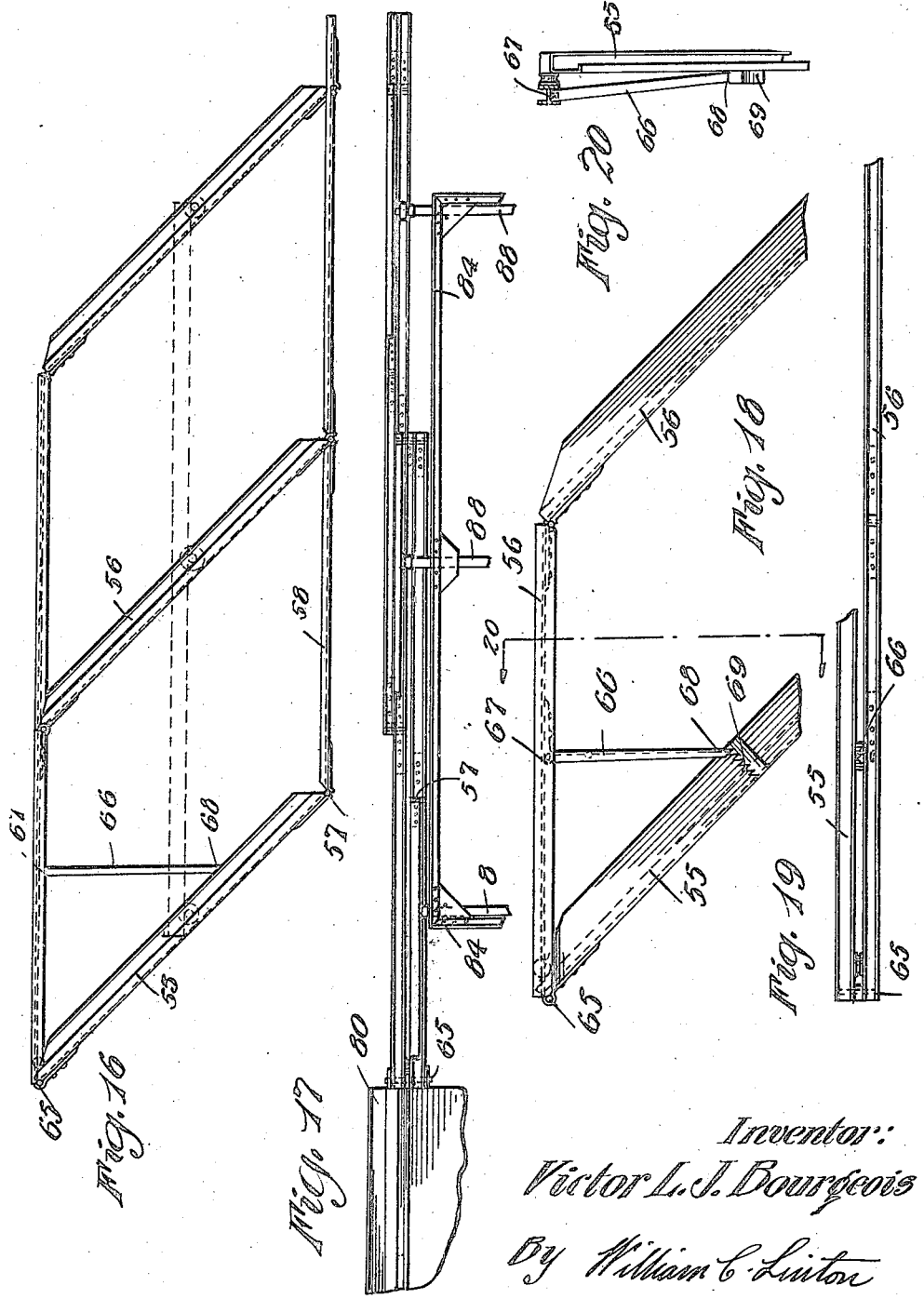

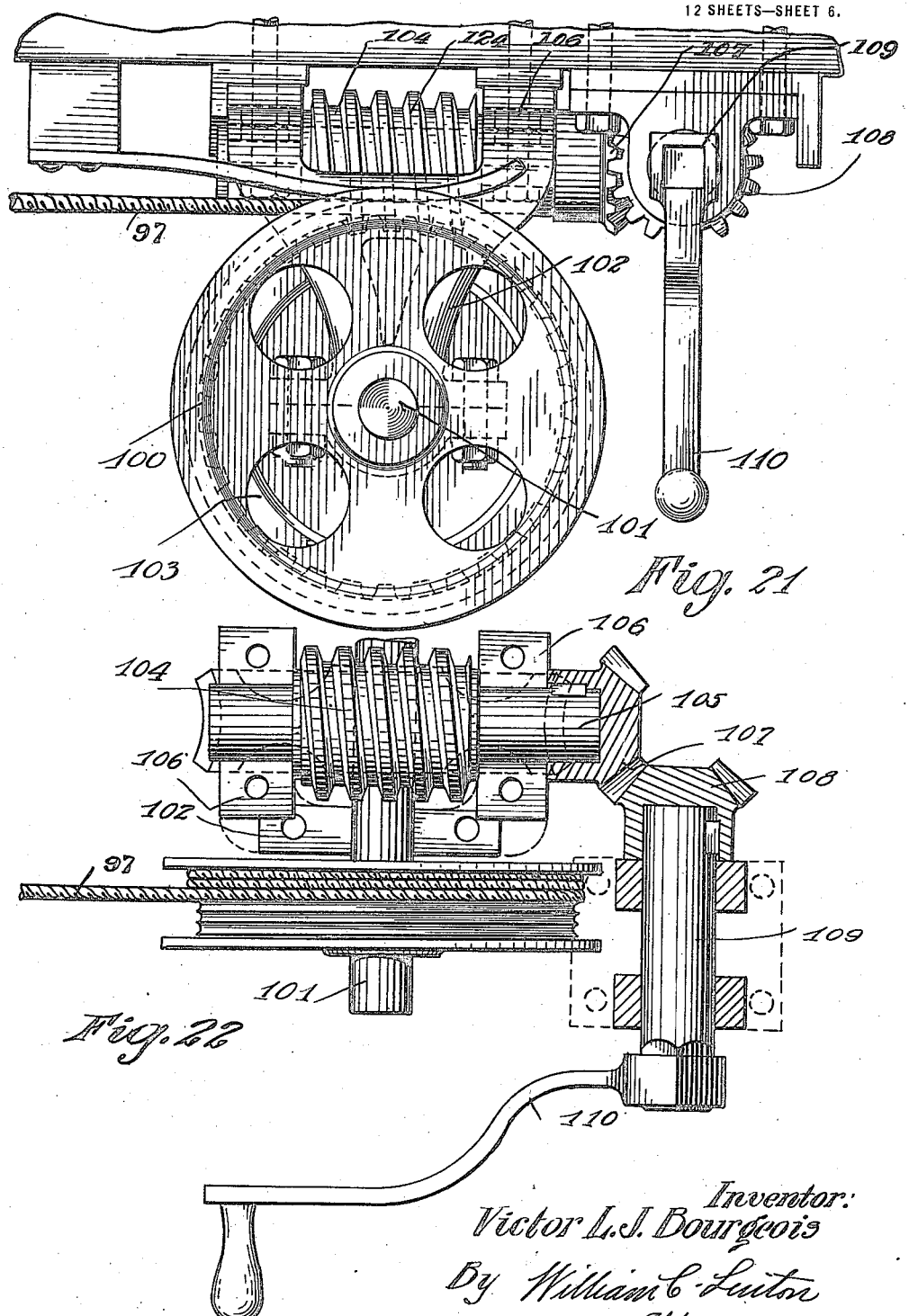

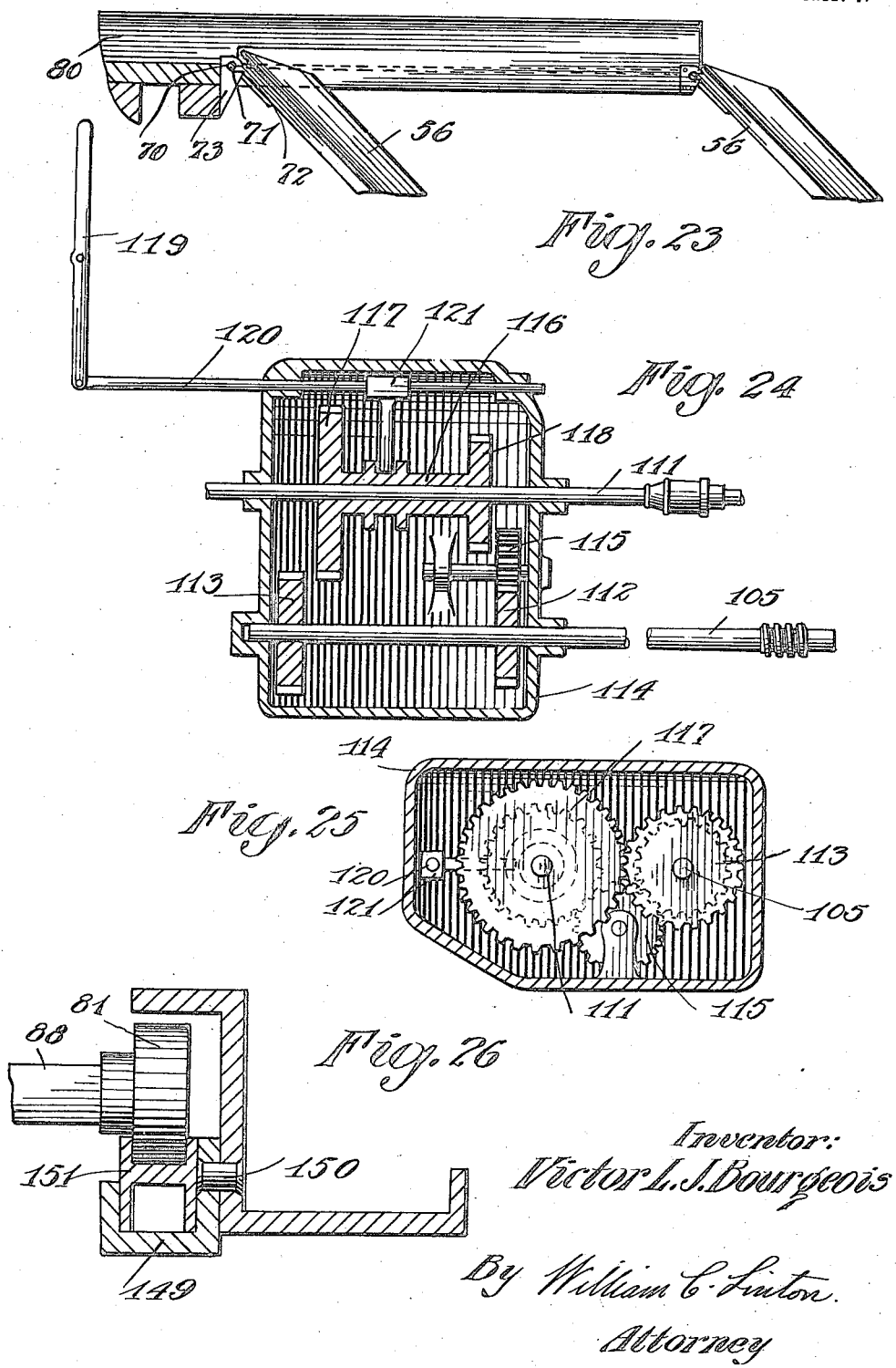

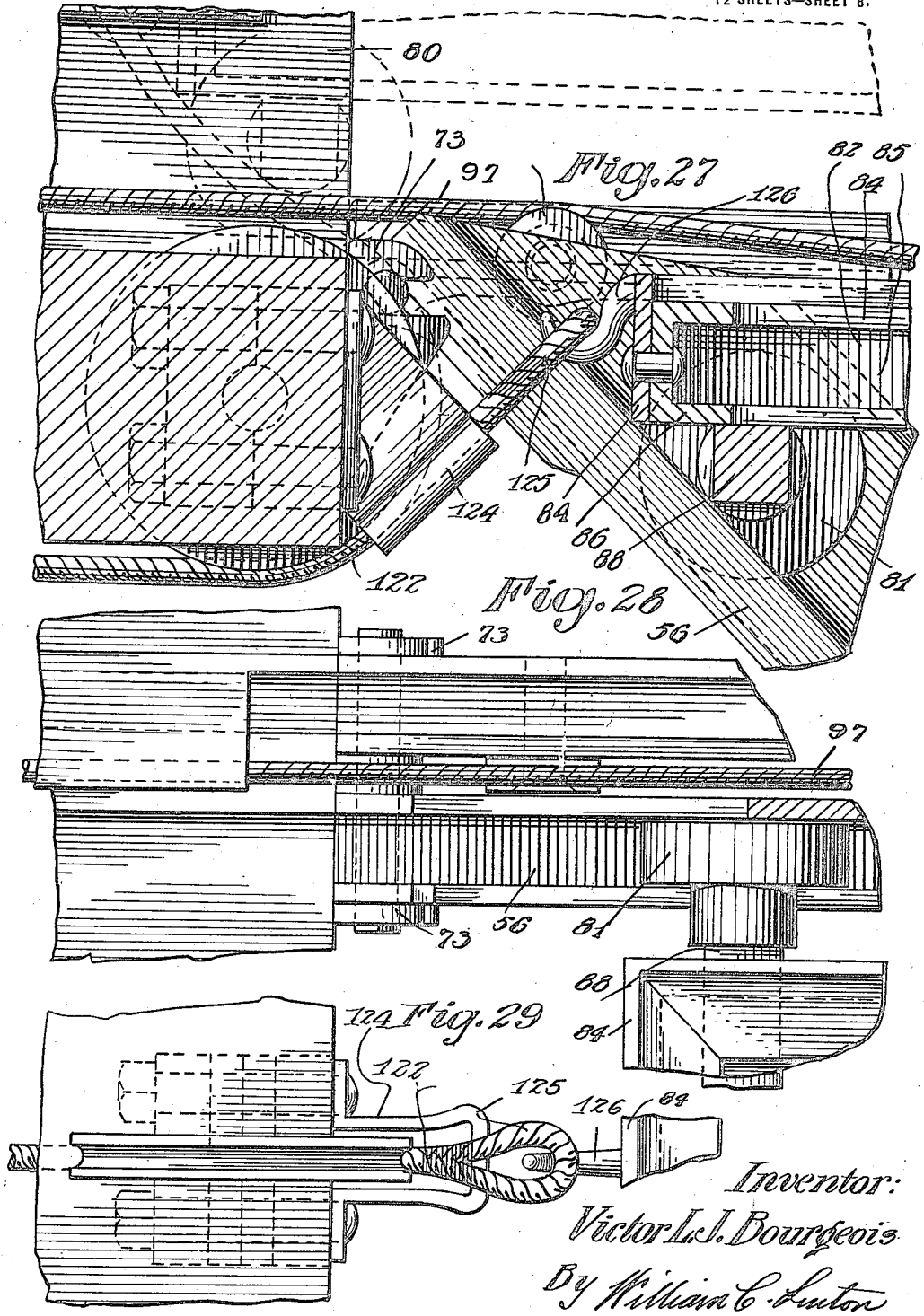

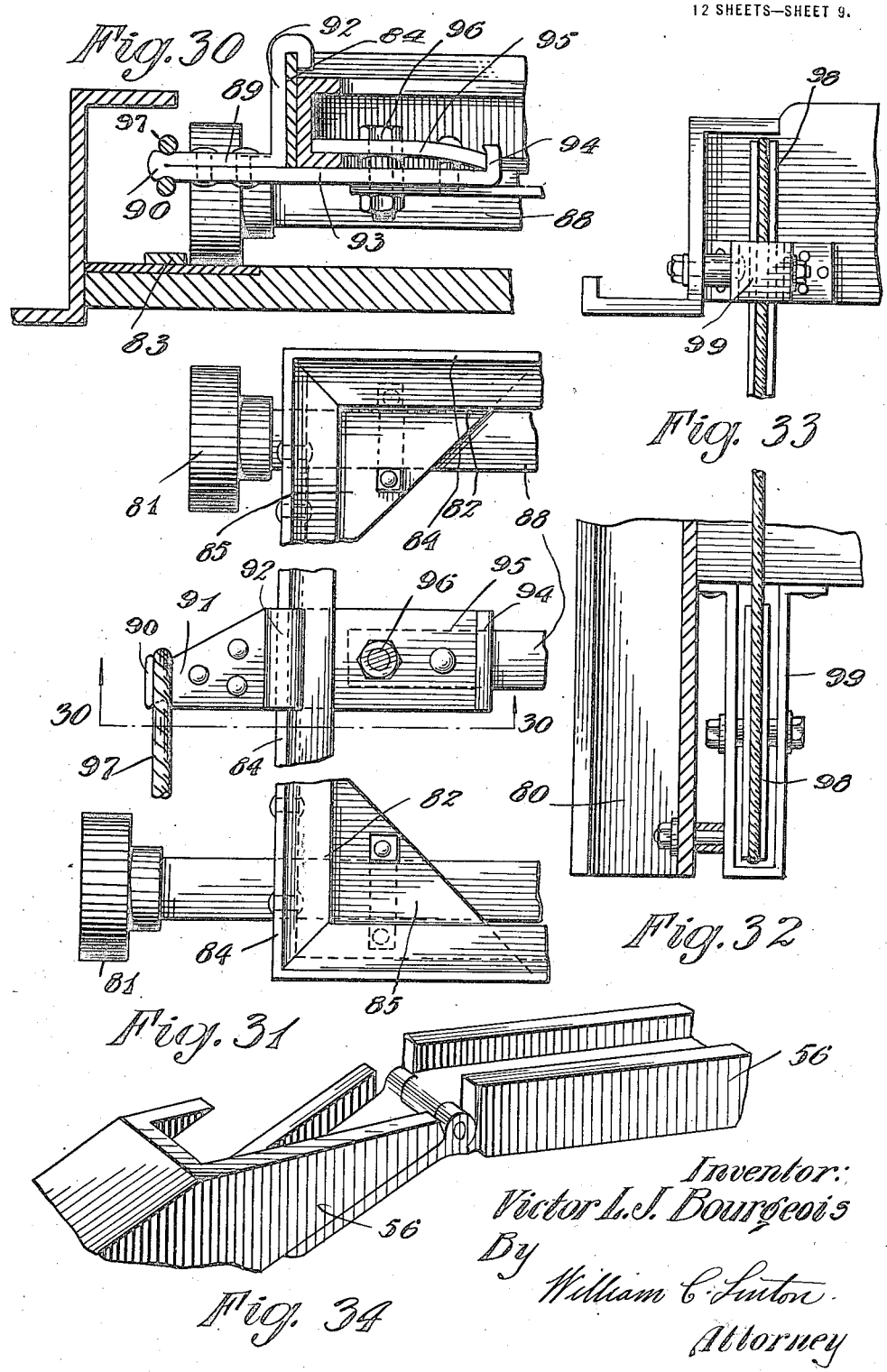

V. L. J. BOURGEOIS.
LOADING AND UNLOADING APPARATUS FOR TRUCKS.
APPLICATION FILED DEC. 4, 1920.
1,427,189.
Patented Aug. 29, 1922.
12 SHEETS—SHEET 10.
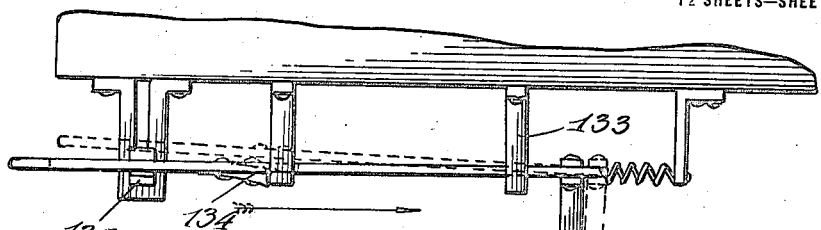
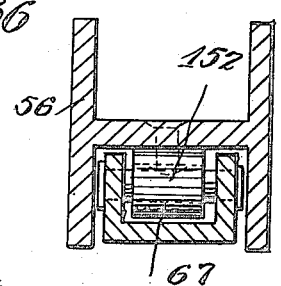
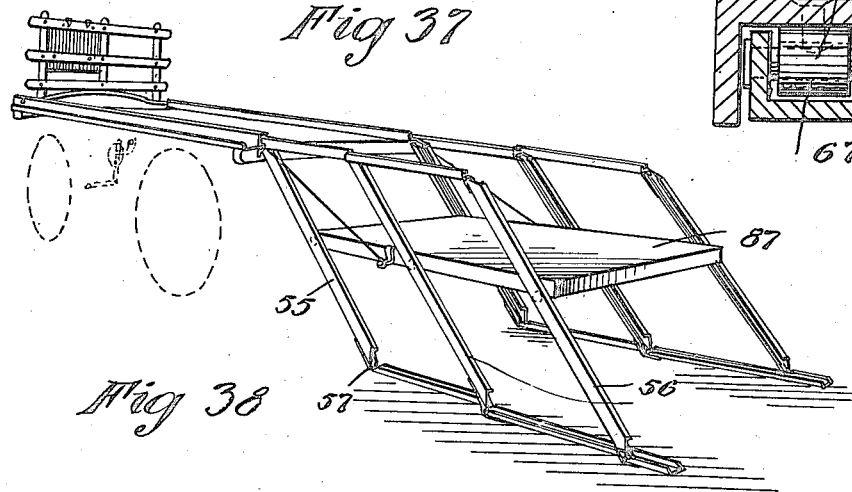
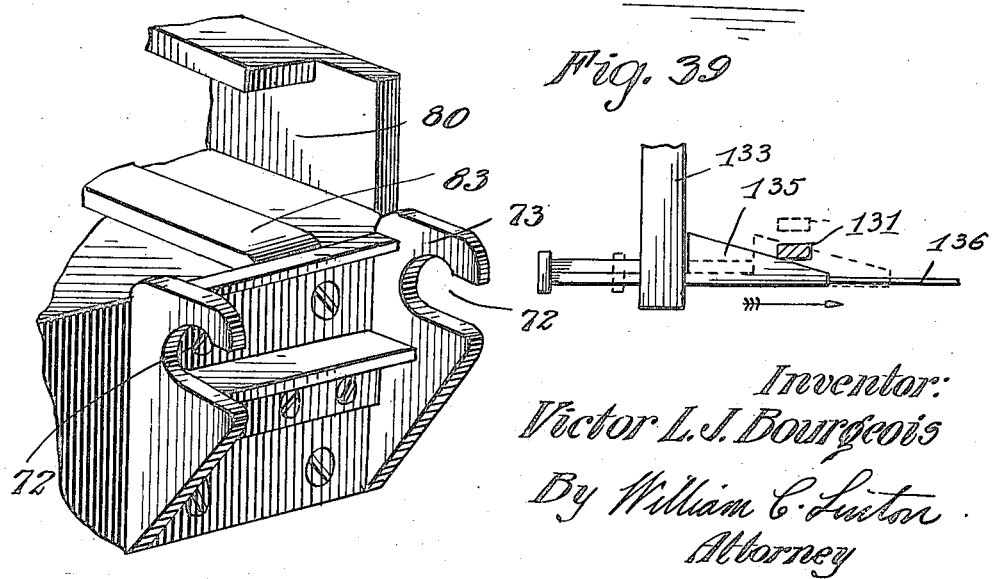
Inventor:
Victor L. J. Bourgeois
By William C. Linton
Attorney

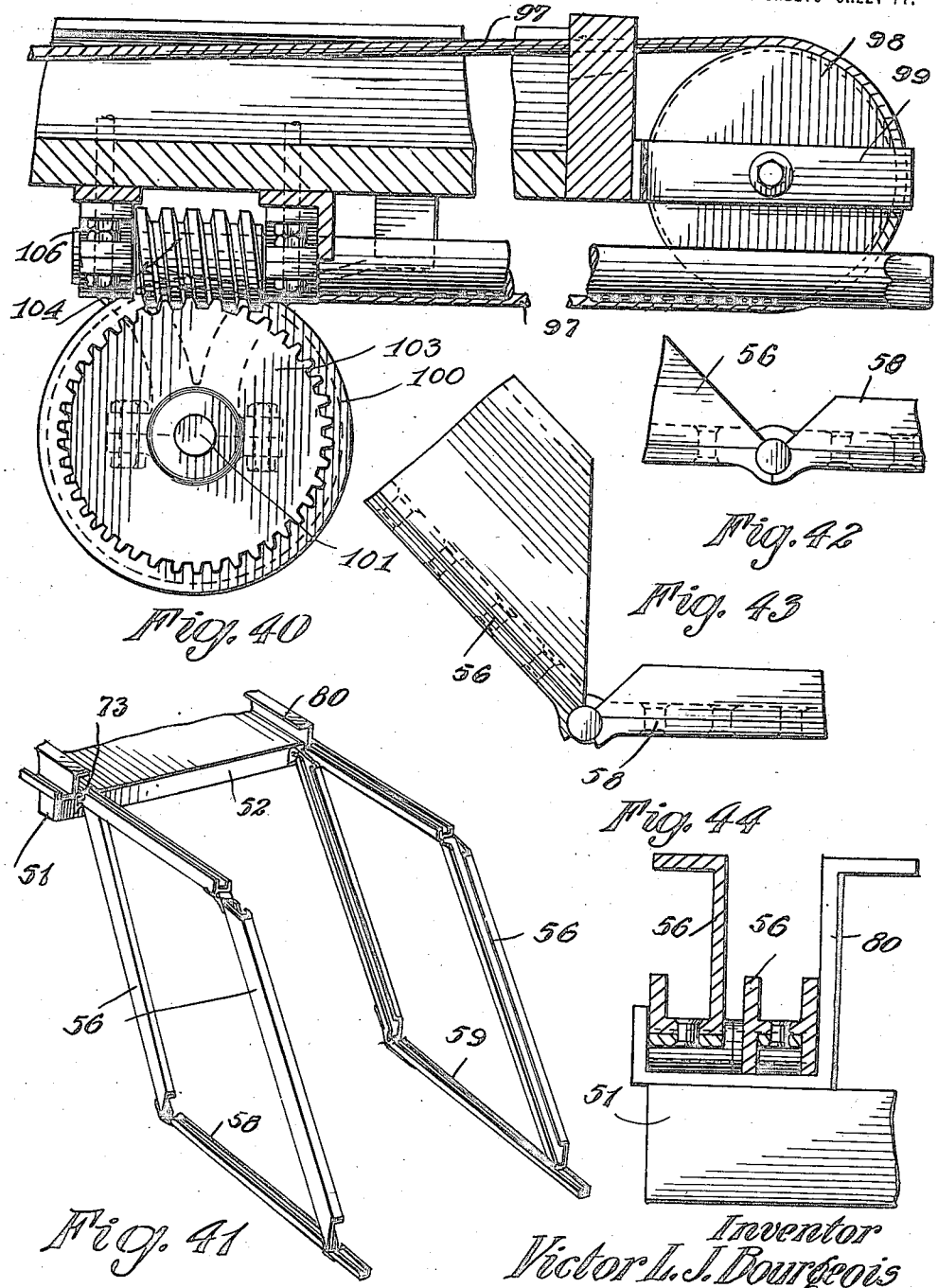

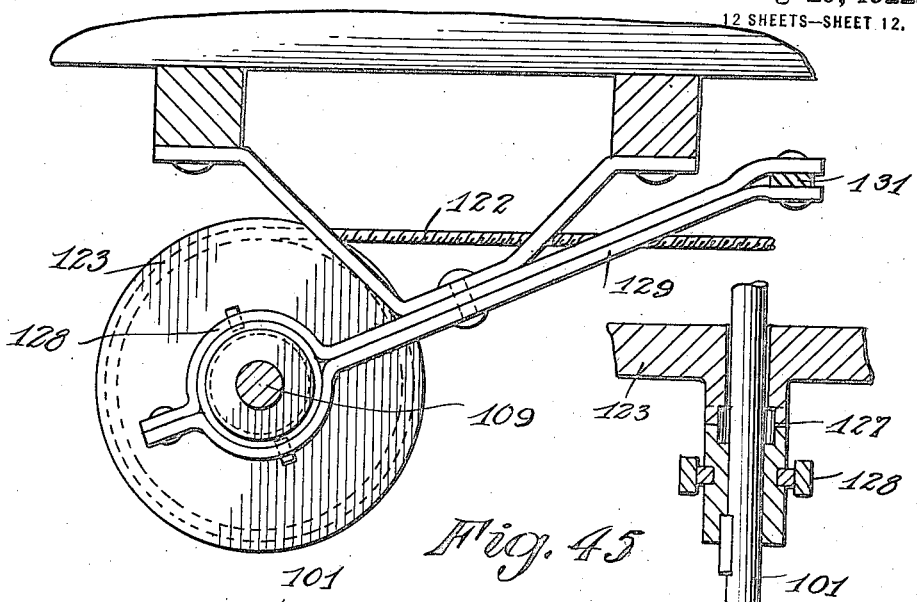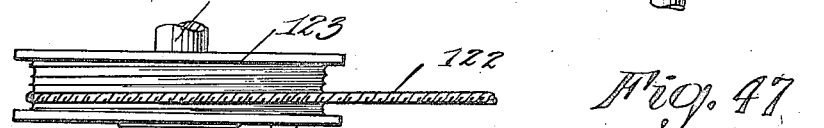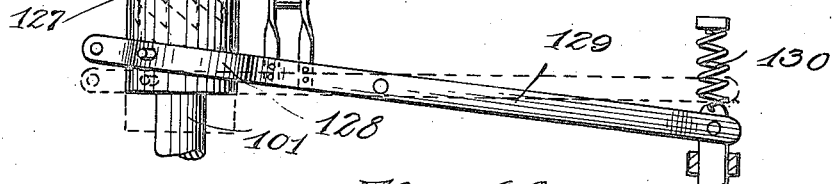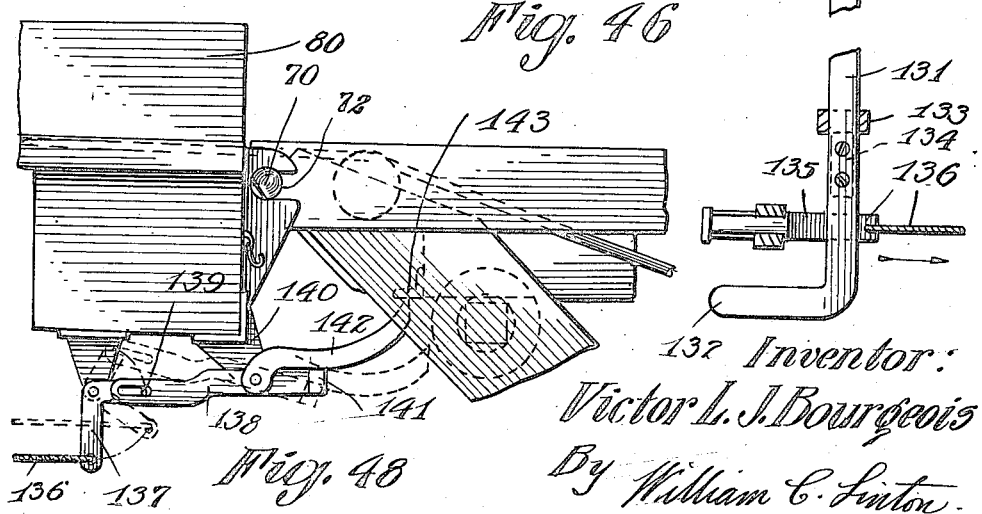

UNITED STATES PATENT OFFICE.

VICTOR L. J. BOURGEOIS, OF MONTREAL, QUEBEC, CANADA, ASSIGNOR OF ONE-HALF TO NAZAIRE DUBOIS, OF MONTREAL, QUEBEC, CANADA.

LOADING AND UNLOADING APPARATUS FOR TRUCKS.

1,427,189.     Specification of Letters Patent.     Patented Aug. 29, 1922.

Application filed December 4, 1920. Serial No. 428,352.

*To all whom it may concern:*

Be it known that I, VICTOR L. J. BOURGEOIS, a subject of the King of Belgium, residing at Montreal, Province of Quebec, Canada, have invented certain new and useful Improvements in Loading and Unloading Apparatus for Trucks; and I do hereby declare that the following is a full, clear, and exact description of the invention, such as will enable others skilled in the art to which it appertains to make and use the same.

The present invention relates to new and useful improvements in loading and unloading apparatus for trucks or other like vehicles.

The primary object of the invention is the provision of a loading and unloading apparatus for trucks and the like by means of which the contents thereof may be placed within the truck or removed therefrom with little or no exertion on the part of the operator.

Another object of the invention is the provision of a loading and unloading apparatus for trucks and the like, which comprises a collapsible frame of parallelogram form, including trucks upon which a carrier may be moved upwardly into the body of the truck or downwardly therefrom to the ground or other place upon which the contents of the truck are to be placed in their removal.

Still another object of the invention is the provision of a loading and unloading apparatus for trucks or other similar vehicles including a collapsible frame which when not in use may be folded against the end of the truck serving as an end gate therefor.

Still another object of the invention is the provision of a loading and unloading apparatus for trucks or other similar vehicles in which provision is made for either manually or by power conveying a carrier from the ground into the body portion of the said truck after the said carrier has been loaded or removing the carrier from the truck and lowering it upon its track either in loaded or unloaded condition as desired.

A still further object of the invention is the provision of manual means for raising and lowering the carrier to and from the ground with little or no exertion on the part of the operator.

Another object of the invention is the provision of means whereby the track which is preferably composed of a frame of parallelogrammic formation and which is so collapsible and foldable that it can be moved when not in use to a position at the end of the truck or other vehicle to which the same is applied and not interfere with the usual manner of operating the said truck.

A further object of the invention is the provision of a loading and unloading apparatus which will be partially automatically operable so that the same can be actuated by a single person if desired.

A still further object of the invention is the provision of a loading and unloading apparatus for trucks or other similar vehicles, which will be comparatively simple and inexpensive to manufacture, reliable and efficient in use, and readily operated.

With the above and other objects in view, the present invention resides in the novel features of construction, formations, combinations, and arrangements of parts to be hereinafter more fully described, claimed, and illustrated in the accompanying drawings, forming a part of the present application, and in which:—

Figure 1 is a perspective view of a truck showing the track section in folded position;

Figure 2 is a similar view showing the same in its lowered or operative position;

Figure 3 is a side elevation of the rear portion of a truck showing the track members lowered in full lines and raised in dotted lines;

Figure 4 is an end view showing the track section in folded position and serving as an end gate for the truck;

Figure 5 is a detail view partly in section showing the method of locking the collapsible frame in its folded position;

Figure 6 is a diagrammatic view showing the frame in lowered position;

Figure 7 is a similar view showing the same in its intermediate position partly folded;

Figure 8 is a similar view showing the same folded;

Figure 9 is a side view of a truck showing a modified form of the invention in which the track sections of the frame are made collapsible and comprise hinged sections;

Figure 10 is an end view thereof;

Figure 11 is a diagrammatic view of the form shown in Figure 9 in its lowered position;

Figure 12 is a similar view showing the same partly folded;

Figure 13 is a similar view showing the same folded;

Figure 14 is a plan view of a body of the truck showing the invention in plan view;

Figure 15 is a longitudinal sectional view showing in detail the method of removably attaching one portion of a collapsible frame to the body of the truck;

Figure 16 is a modified form of the invention showing the frame in side elevation with three track sections employed rather than two sections;

Figure 17 is a plan view of that portion of the frame shown in Figure 16;

Figure 18 is a detail side elevation with parts broken away, showing the brace for retaining the collapsible frame in extended position;

Figure 19 is a plan view of the structure shown in Figure 18;

Figure 20 is a transverse sectional view taken on the line 20—20 of Figure 18;

Figure 21 is an enlarged detail view showing the manual means for actuating the drum;

Figure 22 is a plan view of that portion of the device shown in Figure 21;

Figure 23 is a detail view showing the end of the truck and the upper portions of the extended side members of the truck, also the track sections hinged thereto;

Figure 24 is a horizontal sectional view showing the transmission mechanism for actuating the drum from the drive shaft;

Figure 25 is a transverse sectional view taken through the mechanism shown in Figure 24;

Figure 26 is a detail sectional view illustrating one form of the track section;

Figure 27 is a transverse sectional view taken through the adjacent ends of the truck and the carrier, the latter shown at the upper portion of the track;

Figure 28 is a plan view of a portion of the device shown in Figure 27;

Figure 29 is a similar view showing the means of connecting the cable to the carrier for lowering the latter;

Figure 30 is a transverse sectional view taken through a portion of the truck and carrier showing the means for attaching the operating cable to the latter;

Figure 31 is a plan view of the device disclosed in Figure 30;

Figure 32 is a detail view showing the pulley in plan view over which the operative cable for the carrier passes;

Figure 33 is a side view thereof;

Figure 34 is a detail perspective view showing the pivotal connection between the sections of the track;

Figure 35 is a detail view of the clutch operating lever;

Figure 36 is a transverse sectional view through a portion of the frame;

Figure 37 is a detail perspective view showing a portion of the truck with the track attached thereto and the carrier mounted on the tracks and partly in raised position;

Figure 38 is a detail perspective view showing one manner of removably connecting the collapsible frame to the rear of the truck;

Figure 39 is a detail view showing the means for automatically operating the clutch lever;

Figure 40 is an enlarged sectional view showing the means for driving the operating cable;

Figure 41 is a detail perspective view showing the collapsible frame in lowered position and secured to the rear portion of the truck;

Figures 42 and 43 are detail views showing the sections of the frame in extended and folded positions respectively;

Figure 44 is a view showing portions of the folding frame in transverse section;

Figure 45 is a detail side view of the drum and clutch;

Figure 46 is a plan view thereof;

Figure 47 is a detail sectional view taken through the clutch; and,

Figure 48 is a view in side elevation illustrating the automatic trip mechanism for operating the clutch.

Referring now to the accompanying drawings by corresponding characters of reference throughout the several views, the numeral 50 designates in general an automobile truck or other like vehicle which may be substituted therefor and to which my improved loading and unloading apparatus may be applied.

Thus truck 50 comprises a body portion 51 including a bed 52 having opposite side members 53 attached thereto.

The truck, as shown in the drawings, is provided with the usual wheels 54 and may be driven and steered in any suitable manner.

My improved device comprises preferably a frame 55 which is of a parallelogram type, as clearly shown throughout the various figures of the drawings.

This frame 55 comprises a plurality of inclined track sections 56 which, as shown particularly in Figures 2, 3, 4, 5, 6, 7 and 8, are two in number, while in Figures 16, 17 and the other corresponding views, the track sections are shown three in number, and a detailed description thereof will be mentioned later.

The track sections 56 have hinged to their lower ends as at 57 a frame 58 which comprises opposite side members 59 which are connected by the cross bars 60 and braces 61 which hold them in rigid parallel relation to each other.

The cross bars 60 and adjacent portions of the end members 59 are connected by a suitable member 62 which is preferably in the form of a netting, and when the frame 55 is in the folded position shown in Figure 1, this member 62 forms a convenient end gate for the rear portion of the said truck or other vehicle to which it is applied.

The ends of the side members 53 of the truck have secured thereto channel strips 63 in which one of the members 56 is folded when the frame is in its folded position and in which it is held by means of the spring latches 64.

The manner of folding the device is shown in Figures 6, 7 and 8, which show the track sections 56 and frame 58 in diagrammatic form.

In Figure 6 the frame is shown in its lowered position, and when it is desired to fold the same from the position shown in Figure 2 of the drawings to the position shown in Figure 1 thereof, the tracks 56 and the frame 58 are moved to the horizontal position shown in Figure 7, after which the frame 58 and the rear track 56 are raised to the vertical position shown in dotted lines in Figure 3 and also in Figure 8, in which position they are held by the spring catches or latch members 64. When in this position, as before mentioned, the member 62 serves as an end closure for the truck, as clearly shown in Figure 1.

The frame 55 may be attached to the truck in any preferred manner such as by the hinges shown at 65 particularly in Figure 18, and when in extended position the parallelogrammic frame 55 may be if desired held against collapsing by a pivoted bar 66 which is hingedly connected at its upper end as at 67 to any convenient point desired. The lower end of this bar 66 is beveled as at 68 for engagement with the teeth of a lug 69 which is secured to the inner side of one of the track sections 56.

As shown in the accompanying drawings, one brace 66 may be employed at one side of the frame, or a pair of braces may be employed, one of which is secured to each side of the frame.

As shown particularly in Figure 15 of the drawings, the hinged member 70 is formed detachable, and comprises a pin 71 which flattened side adapted to pass through the slot 72 formed in the bracket member 73.

When it is desired to disconnect the track section 56 from the truck 50, the track section 56 is raised until the pin 71 slides out through the slot 72.

When in attached position, as shown in Figure 15, the flange 74 braces the track 56 and prevents any undesired collapsing of the frame 55, thus eliminating the use of the brace bar 66 previously referred to.

As shown particularly in figures from 9 to 13 inclusive, a modified form of the foldable parallelogrammic frame is provided in which the tracks are indicated by the numerals 75 and 76 hingedly connected to the upper frame 77 and lower frame 78.

This form is used when the rear end of the base 52 terminates flush with the opposite side members of the truck to provide an extension which the frame 77 comprises when desired.

In this form of frame, the track section 75 is hingedly connected intermediate its ends as at 79 and when it is desired to collapse the device, the same is moved from the position shown in Figure 11 to the position shown in Figure 12, after which it is again moved to the position shown in Figure 13. In this form of the invention, a member 62 is attached to the frame 77, and, when in the folded position, as shown in Figure 10, constitutes an end closure for the vehicle.

The track members 56, 75 and 76 and the frame members 77 are all preferably constructed from channel members in which the wheels 81 of the carrier 82 are guided from the ground upward to the body of the truck which likewise has secured therein a suitable track shown at 83 which guides the carrier from the rear end of the track to the forward end thereof as desired.

The carrier 82 comprises preferably a rectangular frame 84 comprising opposite side and end members 85 and 86 which may be provided with a suitable platform 87 upon which the articles may be placed which are to be moved to and from the body of the truck.

Transverse axles 88 are secured to the front and rear portions of the side members 85 of the truck, and the wheels 81 before mentioned are journaled upon the ends thereof exterior of the frame 84.

Attaching clips 89 are secured to the opposite sides of the frame 84 and are adjustably mounted thereon in the following manner.

Each of the clips 85 is formed from strap material which comprises a body portion 90 having a suitable hook 91 formed at its outer end. From the body portion one end of the material is bent upwardly over the edge of the frame 84, as shown at 92, while the opposite end of the material is bent horizontally under the frame as at 93, and has its hooked end 94 in engagement with a locking plate 95, which, by means of the bolt 96, is drawn into engagement with the channel portion of the frame 84 securely locking the body portion 89 against any undesired relative movement with reference to the frame. It is obvious, however, that upon loosening the bolt 96, the hook 91 may be slid longitudinally of the carrier as desired.

The cables 97 which are secured to these hooks 91 extend to the forward end of the truck and pass over pulleys 98 mounted therein in suitable brackets 99. These cables then pass rearwardly along the underside of the truck and pass over the drums 100 which are mounted upon a transverse shaft 101 journaled in suitable bearings 102 secured to the underside of the truck.

It is preferred that a pair of the pulleys 100 are disposed upon opposite sides of the truck for engagement with the opposite cables 97 which pass therealong, while in order to operate the shaft 101 and thus rotate the drums 100 for the purposes of raising the carrier from the lower to the upper portion of the truck and then along the interior of the body of the truck, a worm wheel 103 is keyed to a convenient portion of the shaft 101 and meshes with a worm 104 mounted on a stub shaft 105 in suitable bearings 106 which are likewise secured to the underside of the truck.

A beveled pinion 107 is secured to one end of the shaft 105 and meshes with a similar pinion 108 keyed to the end of a drive shaft 109 which may be operated by a suitable crank 110 mounted at the side of the truck.

The above described means illustrates the means for manually operating the pulley or drum 100, and when it is desired to operate the same by power, it may be driven from the usual drive shaft 111. In this instance a pair of gears 112 and 113 are keyed to the shaft 105, and are mounted within a suitable transmission casing 114. An idler gear 115 meshes with the beforementioned gear 112.

A sleeve 116 is slidably mounted upon, for rotation with, the drive shaft 111 and carries at its opposite ends integral gears 117 and 118, the latter of which is adapted to mesh with the gear 115 which as above described meshes with the gear 112.

An operating lever 119 is operatively connected with the sleeve 116 to slide the same longitudinally upon the shaft 111 through the instrumentality of the rod 120 and yoke 121. Obviously upon the operation of this lever 119 in opposite directions, either the gear 117 will be thrown in mesh with the gear 113 which drives the shaft 105 in one direction, or the gear 118 will be thrown in mesh with the gear 115 which drives the shaft 105 in the opposite direction. This obviously rotates the drum 100 in opposite directions for the purpose of moving the carrier upwardly or downwardly upon the track or forwardly and rearwardly within the truck.

In order to provide for the positive rearward movement of the carrier within the truck, an additional cable 122 is provided which is wound upon a drum 123 which is secured to the shaft 101 intermediate the before described drums 100.

The end of this cable extends to the rear of the truck intermediate the sides thereof and passes through a guide 124, so that the eye 125 at the end thereof will at all times be held in the path of the hook 126, for a purpose to be later explained.

Obviously, as the truck is pulled to the upper end of the track by the cables 97, the hook 126 will engage the eye 125 of the cable 124 raising the latter from the full line position shown in Figure 27 to the dotted line position. In order to prevent the cable from breaking by means of the rotation of the shaft 101, the drum 123 is provided with a suitable clutch element 127 which is operated through the instrumentality of a yoke 128 carried by a lever 129 and normally held in operative position by the spring 130.

The lever 129 has pivotally connected thereto a sliding operating bar 131 which is provided with a suitable handle 132 by means of which the same can be manually operated.

This bar 131 passes through suitable guides 133 and is provided with a stop 134 which is adapted to engage one of said guides for holding the clutch elements 127 in engagement.

A cam plug 135 is adapted to engage the underside of the bar 131 and has attached to its forward end a cable 136 which is connected at its opposite end to a bell crank lever 137 pivoted to the lower side of the truck adjacent the lower end thereof.

This bell crank lever is connected to a bar 138 through a pin and slot mechanism 139 which is pivoted to a bracket 140 mounted at the rear of the truck.

The bar 138 is provided with a lateral extension 141, while pivotally mounted to the bar 138 is a trip member 142, clearly shown in Figure 48.

This trip member is so arranged that when the carrier proceeds upwardly on the track, the stop member 143 will ride over the trip member 142 without affecting the same, but upon the downward movement of the carrier, the stop member 143 will force the trip member 142 from the full to the dotted line positions shown in Figure 48, thus exerting a pull on the cable 137 which draws the cam block 135 in the direction of the arrow shown in Figure 48, thus raising the bar 131 and disengaging the stop 134 from the adjacent guide 133. The spring 130 will then draw the lever 129 from the full to the dotted line position shown in Figure 47, thus disengaging the clutch elements and permitting the free rotation of the drum 123 causing the upward movement of the carrier from the full to the dotted line position shown in Figure 27, and to the forward end of the truck within which the carrier passes.

When in this position, it is simply necessary for the operator to again throw the clutch into engagement by means of the handle 132 of the lever 131, and the rotation of the shaft 101 either through the instrumentality of the crank 110 or the drive shaft 111 moves the carrier from the front to the rear of the truck and to the full line position shown in Figure 27, after which position the said carrier may be lowered by gravity and the hook 126 will disengage itself from the eye 125 of the cable 122.

As clearly shown throughout the various figures of the drawings, the track sections, while they may be of any desired channel construction, are shown preferably of a Z-shaped type in order to give them strength and when in this position, suitable channel members 149 may be riveted thereto as at 150, and suitable tracks 151 may be positioned within the channels 149.

This structure is shown clearly in Figure 26.

As shown in Figures 16 and 17 where a plurality of track sections are employed, the rollers 81 of the truck are spaced in such manner that they will at all times be positioned within the tracks in order to prevent displacement or binding of the carrier during its desired movement.

From the foregoing description, taken in connection with the accompanying drawings, it will be manifest that a loading and an unloading apparatus for trucks or other similar vehicles is provided, which will be comparatively simple and inexpensive to manufacture, reliable and efficient in use, and readily operated.

It should be understood in this connection that various minor changes in the specific details of construction can be resorted to within the scope of the appended claims without departing from the spirit or sacrificing any of the advantages of the invention.

It should be further understood that the invention may be also used at any place desired to elevate a load from a lower to an upper plane, as from a cellar to the street, from the street to the first floor, or from the first to the second floor, or to any other elevation desired.

If desired, a carrier when in its raised position may form the rear portion of the bottom of the truck body and may be retained in this position if desired.

From the operation of this device, the carrier may be raised from its lowermost position to its position flush with the bottom of the truck, and when in this position, the contents thereof may be pushed forwardly from the carrier into the truck.

When such is the case, the clutch mechanism is not needed and may be dispensed with.

Having thus fully described the invention, what I claim as new and desire to protect by Letters Patent is:—

1. The combination with a truck, including channeled members at the rear portion thereof, of a frame hinged to the rear of said truck, and foldable from operative to inoperative position within said channeled members attached to the truck, latches for locking the frame within the said channeled members, and a strip attached to one of the foldable portions of the frame, forming an end gate for said truck.

2. The combination in an apparatus such as above described, with a truck of a frame attached thereto and including inclined tracks leading to the truck, guides mounted within the truck, a carrier mounted upon said guides for movement to the truck and within the truck, a cable detachably connected with the carrier for moving the same to the guides and lowering the same upon the tracks, and cables attached to the truck for raising the carrier upon the tracks and propelling the same within the truck.

3. The combination in a machine of the character described with a truck, of inclined tracks leading to said truck, a carrier mounted thereon, means for raising the carrier upon the inclined tracks and propelling the carrier within the truck, means for lowering the carrier upon the tracks, said last mentioned means including a cable, an eye provided at one end of the cable, a hook carried by the carrier for detachably engaging said eye, a drum upon which the cable is wound and by means of which the cable is actuated, and a clutch for said last mentioned drum.

4. The combination in a machine of the character described with a truck, of inclined tracks leading to said truck, a carrier mounted thereon, means for raising the carrier upon the inclined tracks and propelling the carrier within the truck, means for lowering the carrier upon the track, said last mentioned means including a cable, an eye provided at one end of the cable, a hook carried by the carrier for detachably engaging said eye, a drum upon which the cable is wound and by means of which the cable is actuated, a clutch for said last mentioned drum, and an automatic trip operated by the carrier for actuating the clutch.

5. The combination in a device of the character described with a truck, inclined tracks leading thereto, a carrier mounted upon said tracks, a shaft, a pair of drums attached thereto, hoisting cables wound upon said drums and attached to the carrier for receiving the latter upon the rotation of the shaft in one direction, a second drum attached to the shaft, a cable connected thereto, means for detachably connecting the last mentioned cable to the carrier, and means for actuating the shaft.

6. The combination with a truck such as described, of inclined tracks attached thereto, a carrier mounted upon said tracks, a rotatable shaft, means for actuating said shaft, a pair of drums attached to the ends of the shaft, cables attached to the drums and to the opposite sides of the carrier for hoisting the latter upon the tracks, an additional drum secured to the intermediate portion of the shaft, a cable wound thereon, an eye secured to the end of the cable, a hook secured to the carrier for detachably engaging said eye, and a clutch for the last mentioned drum, substantially as and for the purposes set forth.

7. The combination in a device of the character described with a truck, of a frame foldably attached thereto and including a plurality of tracks, a carrier mounted upon said tracks, a shaft journaled upon the lower side of the truck, tracks secured thereto, cables attached to the drums and to said carrier, a worm wheel mounted upon said shaft, a second shaft mounted upon the truck, a worm secured thereto and meshing with the worm wheel, and means for rotating the worm and raising and lowering the carrier upon the tracks.

8. The combination in a machine of the character described, with a truck, a track attached thereto, a carrier mounted upon said track, a shaft mounted upon the truck and operatively connected to the carrier for actuating the latter, a second shaft for actuating the first mentioned shaft, gears keyed to the second shaft, a sleeve slidably mounted upon the drive shaft of the truck and rotatable therewith, and gears carried by the sleeve for alternately meshing with the first mentioned gears, as and for the purposes set forth.

9. The combination with a truck of a track secured thereto, a carrier movably mounted upon said track, a shaft journaled upon said truck, an operative connection between the shaft and the carrier for actuating the latter upon the track, a second shaft mounted upon the truck, a worm drive between said first and second shafts, a pair of gears keyed to the second shaft, an idler gear meshing with one of the gears keyed to the second shaft, a sleeve slidable upon the drive shaft of the truck, gears carried by the sleeve for meshing with one of the gears secured to the second mentioned shaft and the idler gear, and means for actuating the sleeve to throw the gears into alternative engagement.

10. The combination with a vehicle body, of a track attached thereto, a carrier mounted upon said track, a shaft, means for rotating the shaft, a drum mounted upon the shaft, a clutch for said drum, a lever connected to one of the elements of the clutch, a spring engaging said lever, a bar for actuating the lever, a stop provided upon said bar for holding the clutch in one position, a trip mechanism operatively connected to the bar for releasing the latter and actuating the clutch, and means carried by the carrier for engaging the trip mechanism and actuating the same.

11. The combination with a vehicle body, of a track operatively connected thereto, a carrier movable upon said track, a trip actuating means carried by the carrier, a rotatable shaft, a drum carried thereby, a clutch for said drum, a lever attached to the clutch, a spring for retaining the clutch in inoperative position, a bar attached to the lever, a stop mechanism carried by the bar for retaining the clutch in operative position, a beveled block engaging said bar for releasing the bar and throwing the clutch into inoperative position, and a trip mechanism operatively connected to the block for engagement with the trip actuating member mounted upon the carrier.

12. The combination with a truck of an inclined track attached thereto, a carrier movable upon said track, means for raising the carrier upon the track, means for lowering the carrier upon the track, including said last named means, a shaft, a drum mounted thereon, a cable attached to the drum and removably engaging the carrier, a clutch for said drum, a lever connected to the clutch, a spring attached to the lever for normally forcing the clutch to inoperative position, a bar attached to the lever, a vehicle piece secured to the bar for manually operating the latter and throwing the clutch into engagement, guides for said bar, a stop carried by the bar for engaging said guides and locking the clutch in operative position, a beveled block engaging the lever for releasing the stop from the guide upon movement of the bar, a cable attached to said block, a trip mechanism attached to the cable, and a member carried by the carrier for engaging the trip mechanism and actuating the latter upon the downward movement of the carrier.

13. The combination with a vehicle body, of a folding frame, said frame comprising Z-shaped side members, channel members secured thereto, tracks secured to said channel members, and a carrier mounted in said tracks.

14. The combination with a truck, of brackets secured thereto, a foldable frame, pins extending from said frame and having their sides flattened, said brackets having openings therein of a diameter equal to the diameter of the pins and receiving said pins, slots leading from said openings equal to the diameter of the pins through their flattened portions for removably connecting the frame to the truck, and a carrier mounted upon said frame, as and for the purposes set forth.

15. The combination with a truck, of a folding frame removably connected to said truck and adapted to be folded downwardly in parallelogrammic form into operative position, a horizontally disposed carrier mounted in said frame and operative therein, said frame being foldable against the end of the truck and carrying an end closure for the truck.

16. The combination with a truck, of a foldable frame removably attached thereto, said frame being foldable downwardly into a parallelogrammic form, said frame including spaced tracks, a carrier mounted upon said tracks, rollers carried by the carrier for engaging said tracks, said carrier having attaching hooks secured to the sides thereof, cables carried by the attaching hooks for locking the carrier upon said tracks, an additional cable removably attached to the carrier for lowering the latter upon the tracks, said frame when not in use being foldable against the rear of the truck, forming an end closure for the latter, and means for retaining the frame in its last mentioned folded position.

17. The combination with a vehicle body, of a foldable frame of parallelogrammic formation, the upper side of which consists of a portion of a vehicle body, and a door disposed in the lower portion of said foldable frame, as described and for the purposes set forth.

18. The combination with a truck, including channeled members at the rear portion thereof, of a frame hinged to the rear of said truck, and foldable from operative to inoperative position within said channeled members attached to the truck, a carrier mounted in said frame, latches for locking the frame within the said channeled members, and a strip attached to one of the foldable portions of the frame, forming an end gate for said truck.

19. The combination in an apparatus such as above described, with a truck, of a frame attached thereto and including inclined tracks leading to the truck, guides mounted within the truck, a carrier mounted upon said tracks for movement to the truck and upon the guides, and means for moving the carrier along the track and guides.

20. The combination in a machine of the character described with a truck, of inclined tracks leading to said truck, a carrier mounted thereon, means for raising the carrier upon the inclined tracks and propelling the carrier within the truck, means for propelling the carrier within the truck and lowering the carrier upon the track, said last mentioned means including a cable, an eye provided at one end of the cable, a hook carried by the carrier for detachably engaging said eye, a drum upon which the cable is wound and by means of which the cable is actuated, and a clutch for said last mentioned drum.

21. The combination in a machine of the character described with a truck, inclined tracks leading to said truck, a carrier mounted thereon, means for raising the carrier upon the inclined tracks and propelling the carrier within the truck, means for lowering the carrier upon the track, said last mentioned means including a cable, an eye provided at one end of the cable, a hook carried by the carrier for detachably engaging said eye, a drum upon which the cable is wound and by means of which the cable is actuated, a clutch for said last mentioned drum, and an automatic trip operated by the carrier for actuating the clutch.

22. The combination in a device of the character described with a truck, inclined tracks leading thereto, a carrier mounted upon said tracks, a shaft, a pair of drums attached thereto, hoisting cables wound upon said drums and attached to the carrier for receiving the latter upon the rotation of the shaft in one direction, a second drum attached to the shaft, a cable connected thereto, means for detachably connecting the last mentioned cable to the carrier, and means for actuating the shaft.

23. The combination with a truck such as described, of inclined tracks attached thereto, a carrier mounted upon said tracks, a rotatable shaft, means for actuating said shaft, a pair of drums attached to the ends of the shaft, cables attached to the drums and to the opposite sides of the carrier for hoisting the latter upon the tracks, an additional drum secured to the intermediate portion of the shaft, a cable wound thereon, an eye secured to the end of the cable, a hook secured to the carrier for detachably engaging said eye, and a clutch for the last mentioned drum, substantially as and for the purposes set forth.

24. The combination in a device of the character described with a truck, of a frame foldably attached thereto and including a plurality of tracks, a carrier mounted upon said tracks, a shaft journaled upon the lower side of the truck, tracks secured thereto, cables attached to the drums and to said carrier, a worm wheel mounted upon said shaft, a second shaft mounted upon the truck, a worm secured thereto and meshing with the worm wheel, and means for rotating the worm and raising and lowering the carrier upon the tracks.

25. The combination in a machine of the character described, with a truck, a track attached thereto, a carrier mounted upon said track, a shaft mounted upon the truck and operatively connected to the carrier for actuating the latter, a second shaft for actuating the first mentioned shaft, gears keyed to the second shaft, a sleeve slidably mounted upon the drive shaft of the truck and rotatable therewith, and gears carried by the sleeve for alternately meshing with the first mentioned gears, as and for the purposes set forth.

26. The combination with a truck of a track secured thereto, a carrier movably mounted upon said track, a shaft journaled upon said truck, an operative connection between the shaft and the carrier for actuating the latter upon the track, a second shaft mounted upon the truck, a worm drive between said first and second shafts, a pair of gears keyed to the second shaft, an idler gear meshing with one of the gears keyed to the second shaft, a sleeve slidable upon the drive shaft of the truck, gears carried by the sleeve for meshing with one of the gears secured to the second mentioned shaft and the idler gear, and means for actuating the sleeve to throw the gears into alternative engagement.

27. The combination with a vehicle body, of a track attached thereto, a carrier mounted upon said track, a shaft, means for rotating the shaft, a drum mounted upon the shaft, a clutch for said drum, a lever connected to one of the elements of the clutch, a spring engaging said lever, a bar for actuating the lever, a stop provided upon said bar for folding the clutch in one position, a trip mechanism operatively connected to the bar for releasing the latter and actuating the clutch, and means carried by the carrier for engaging the trip mechanism and actuating the same.

28. The combination with a vehicle body, of a track operatively connected thereto, a carrier movable upon said track, a trip actuating means caried by the carrier, a rotatable shaft, a drum carried thereby, a clutch for said drum, a lever attached to the clutch, a spring for retaining the clutch in inoperative position, a bar attached to the lever, a stop mechanism carried by the bar for retaining the clutch in operative position, a beveled block engaging said bar for releasing the bar and throwing the clutch into inoperative position, and a trip mechanism operatively connected to the block for engagement with the trip actuating member mounted upon the carrier.

29. The combination with a truck of an inclined track mounted thereon, a carrier movable upon said track, means for raising the carrier upon the truck, means for lowering the carrier upon the track, including a shaft, a drum mounted thereon, a cable attached to the drum and removably engaging the carrier, a clutch for said drum, a lever connected to the clutch, a spring attached to the lever for normally forcing the clutch to inoperative position, a bar attached to the lever, a vehicle piece secured to the bar for manually operating the latter and throwing the clutch into engagement, guides for said bar, a stop carried by the bar for engaging said guides and locking the clutch in operative position, a beveled block engaging the lever for releasing the stop from the guide upon movement of the bar, a cable attached to said block, a trip mechanism attached to the cable, and a member carried by the carrier for engaging the trip mechanism and actuating the latter upon the downward movement of the carrier.

30. The combination with a vehicle body, of a folding frame, said frame comprising Z-shaped side members, channel members secured thereto, tracks secured to said channel members, and a carrier mounted in said tracks.

31. The combination with a vehicle body, of brackets secured thereto, a foldable frame, pins extending from said frame and having their sides flattened, said brackets having openings therein of a diameter equal to the diameter of the pins, slots leading from said openings equal to the diameter of the pins through their flattened portions for removably connecting the frame to the truck, flanges engaging the frame for preventing its collapsing when in operative position, and a carrier mounted upon said frame, as and for the purposes set forth.

32. The combination with a vehicle body, of a folding frame removably connected to said truck and adapted to be folded downwardly in parallelogrammic form into operative position, a horizontally disposed carrier mounted in said frame, and operative therein when the frame is in its lowermost position, said frame being foldable against the end of the truck when in inoperative position and constituting an end closure for the truck.

33. The combination with a vehicle body, of a foldable frame removably attached thereto, said frame being folded downwardly into operative position and when in such position assuming parallelogrammic form, said frame including spaced tracks, a carrier mounted upon said tracks and at all times maintained in horizontal position, rollers carried by the carrier for engaging said tracks, said carrier having attaching hooks secured to the sides thereof, cables carried by the attaching hooks for locking the carrier upon said tracks, an additional cable removably attached to the carrier for lowering the latter upon the tracks, said frame when not in use being foldable against the rear of the truck, forming an end closure for the latter, and means for retaining the frame in its last mentioned folded position.

34. The combination with a truck, of a foldable frame of parallelogrammic formation, the upper side of which consists of a portion of the truck, and the lower portion of which includes a door.

35. The combination with a truck of a carrier, said carrier when in raised position forming an extension with the bottom of said truck, and a track extending from the truck upon which the carrier may be lowered.

In witness whereof I have hereunto set my hand.

VICTOR L. J. BOURGEOIS.